W. C. FARNUM.
ECCENTRIC BEARING BOX.
APPLICATION FILED SEPT. 11, 1917.

1,278,800.

Patented Sept. 10, 1918.

Inventor:
William C. Farnum,
by Robt. P. Haines
Attorney

UNITED STATES PATENT OFFICE.

WILLIAM C. FARNUM, OF WINCHENDON, MASSACHUSETTS, ASSIGNOR TO WILLIAM M. WHITNEY, OF WINCHENDON, MASSACHUSETTS.

ECCENTRIC BEARING-BOX.

1,278,800.   Specification of Letters Patent.   Patented Sept. 10, 1918.

Application filed September 11, 1917. Serial No. 190,862.

*To all whom it may concern:*

Be it known that I, WILLIAM C. FARNUM, a citizen of the United States, residing at Winchendon, county of Worcester, State of Massachusetts, have invented an Improvement in Eccentric Bearing-Boxes, of which the following description, in connection with the accompanying drawings, is a specification, like characters on the drawings representing like parts.

The invention hereinafter described relates to bearing boxes for machine tool spindles, connecting rods for crank shafts, and other purposes.

The wear on such boxes is frequently greatest at one side of the box. For example, the work operated on by a machine tool cutter is usually pressed against one side of the cutter, and consequently the principal pressure of the spindle carrying the cutter is against one side of the bearing box. This wear enlarges the bore in the box and causes objectionable play of the spindle in the box, and consequent unsatisfactory work.

Heretofore bearing boxes have been made of curved wedge shaped sections and devices have been provided for adjusting these sections to compensate for wear, but these devices are objectionable for various reasons. Among others, they fail to maintain the sections against warping and distortion; they fail to provide the desired control over the sections; and the parts of the bearing cannot be assembled and replaced with the desired ease and convenience.

The present invention aims to overcome the aforesaid objections. One purpose is to provide a bearing box having simple and effective means for positively adjusting the sections of the box and confining the same against distortion. Another purpose is to provide adjusting means for the sections which is conveniently accessible and easily operated with a desired nicety of control. And another purpose is to provide a bearing box, the parts of which may be easily and quickly assembled and replaced by others when sufficiently worn.

The character of the invention may be best understood by the following description of one good form thereof shown in the accompanying drawing, wherein.

Figures 1, 2:
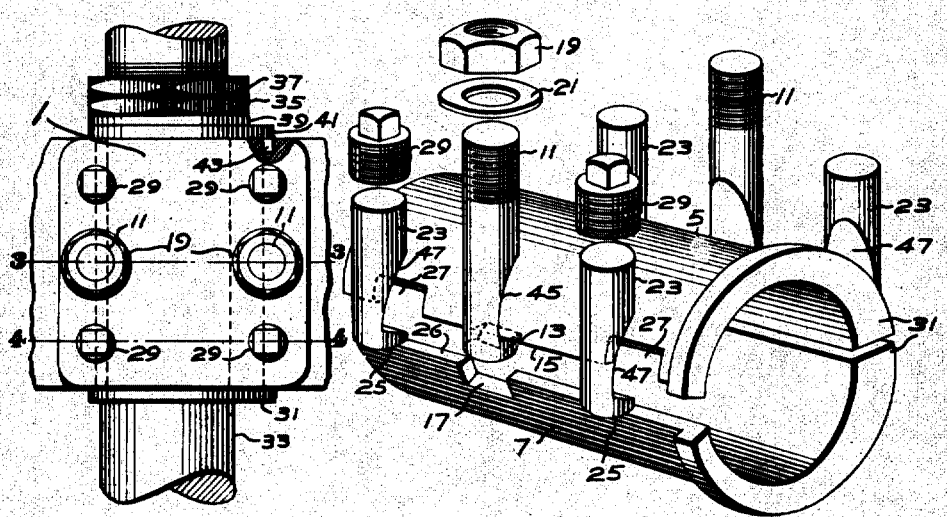
Figure 1 is a plan of a standard equipped with a bearing box embodying the invention.
Fig. 2 is a perspective view of the box sections and the pull and push elements for adjusting said sections.

Referring to the drawings, the bearing box, in the present instance of the invention, is shown mounted in a housing 1 (Fig. 1) which may be part of a standard of a machine tool, but obviously the bearing box is suitable for mounting in many other uses. This housing may be of one solid piece with a circular bore 3 conveniently formed therein to receive the box. This relieves the necessity of making the housing in sections and consequently adds to the strength and desirability thereof.

The bearing box, in the present instance of the invention, comprises a pair of upper and lower members or sections 5 and 7 so shaped that relative rotative adjustment thereof in said bore will cause the bearing opening afforded thereby to contract and reduce the circumference thereof. These sections may conveniently be wedge shaped for this purpose. Their outer surfaces may be curved to conform to the housing bore, and their inner surfaces may be curved to present an opening eccentric in said box, for receiving a spindle 9 or other rotative member therein.

Next will be described the means for adjusting the sections. To this end the upper section may be provided with pull elements shown herein as plugs 11 (Figs. 2 and 3) having hooks 13 at their lower ends adapted to engage and pull up against the ends 15 of the upper section. The lower section may have recesses 17 therein to accommodate the hook ends of the plugs and prevent interference therefrom with the rotative adjustment of the ends of the sections toward one another.

The construction is such that when one of the plugs 11 is adjusted down and the other is adjusted up, the section will be given a positive rotative adjustment.

To adjust and secure the plugs in position, their upper end portions may be threaded to receive nuts 19 adapted to bear on washers 21 resting on the top of the standard.

The lower section may be provided with push elements shown herein as plugs 23 (Figs. 2 and 4) having feet 25 at their lower ends adapted to engage and press down upon the ends 26 of the lower section. The upper section may have recesses 27 therein to accommodate the plug feet 25 and prevent interference therefrom with the rotative adjustment of the ends of the sections toward one another.

The construction is such that when one of the plugs 23 is adjusted down and the other is adjusted up, the lower section will be given a positive rotative adjustment.

To adjust and secure the plugs 23 in position, screw plugs 29 may be threaded in the holes receiving the adjusting plugs and bear against the upper ends of the latter.

One pair of pull plugs and two pairs of push plugs are shown herein, but the number of plugs may be varied according to conditions as desired.

It will be noted that the plugs are applied to the ends of the sections. There are important advantages in this construction. Temperature changes produced on the sections tend to cause them to warp and contract the ends of a section toward each other, thereby destroying the truly circular arc contour of the section and preventing proper fit of the section with the spindle. The pull plugs will desirably prevent such warping, since they act on the ends of the section so as to spread them and press and maintain the section in intimate contact with the circular surface of the bore in the housing. Similarly the push plugs serve to prevent warping of the lower section.

The pull plugs and push plugs may be so mounted in the housing that they will project in the same direction from the bearing box, up toward the top of the standard where their adjusting nuts and screws are conveniently accessible.

To secure the box sections against axial movement in the bore of the housing, they may have flanges 31 (Figs. 1 and 2) at one end thereof adapted to engage one side of the housing and the spindle may have a flange or shoulder 33 to engage said section flanges. An adjusting nut 35 and a lock nut 37 are threaded on the spindle at the opposite side of the housing, a movable washer 39 and a fixed washer 41 being interposed between the adjusting nut and said side of the housing. The fixed washer may be secured against rotation by a pin 43 projecting therefrom into a hole in the housing.

The construction is such that the parts may be easily and quickly assembled and replaced by others when worn. To assemble the parts, the lower section is slid axially into the bore of the housing and the push plugs brought into engagement therewith, and then the pull plugs are inserted and the upper section is slid axially into the bore of the housing and the pull plug hooks brought into engagement therewith. To remove the parts, the pull and push plugs are loosened and the sections may then be withdrawn axially from the housing bore.

The pull plugs may be slabbed off at 45 (Figs. 2 and 3) and the push plugs may be slabbed off at 47 (Figs. 2 and 4) to permit the sections to be slid to and from the bore without interference therefrom.

Figures 3, 4:
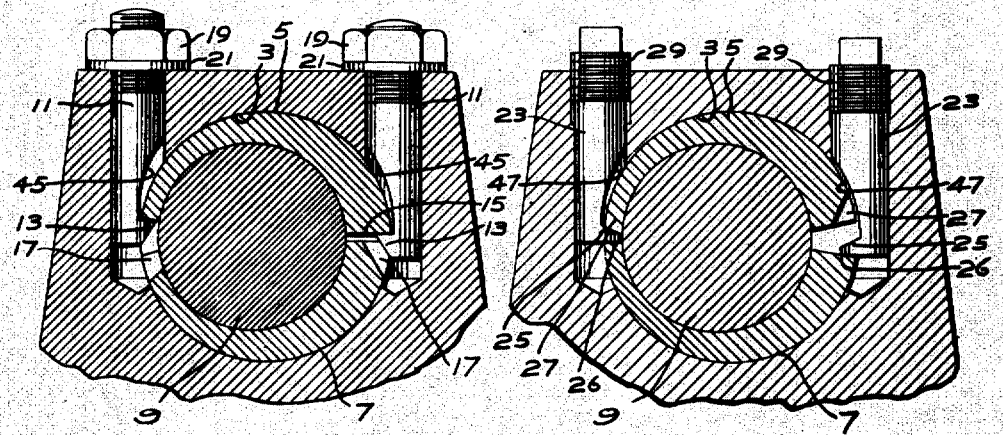
Fig. 3 is a vertical section taken on line 3—3 of Fig. 1 showing the relation of the pull plugs with the upper section.
Fig. 4 is a vertical section taken on line 4—4 of Fig. 1 showing the relation of the push plugs with the lower section when the sections are adjusted to different positions from those shown in Fig. 3.

When the sections are originally assembled, they may be adjusted so that their thicker ends are closely adjacent as shown in Fig. 3, but after they become worn from the friction of the spindle thereon, their narrower ends may be adjusted toward one another from time to time, until finally they are closely adjacent as shown in Fig. 4. This range of adjustment will serve the life of the parts. Then the worn sections may be removed and new ones substituted therefor.

It will be understood that the invention is not limited to the particular embodiment shown herein, but that various deviations may be made therefrom without departing from the spirit and scope of the appended claims.

What is claimed is:—

1. A bearing comprising, in combination, a housing having a bore therein, a box comprising sections mounted in said bore and curved to present an opening adapted to receive a rotative member, said sections being formed to reduce said opening on rotative adjustment thereof in said bore, and means to impart such adjustment to said sections, including pull elements engaging the ends of one of said sections, and push elements engaging the ends of the other section.

2. A bearing comprising, in combination, a housing having a bore therein, a box comprising sections of variable thickness mounted in said bore and curved to conform to the contour of said bore, and means to relatively adjust said sections to take up wear and having means acting on both ends of each of said sections to press and maintain the sections against and in conformity with said bore to prevent warping of said sections.

3. A bearing comprising, in combination, a housing having a bore therein, a box comprising sections mounted in said bore and formed to take up wear on rotative adjustment thereof in said bore, and means to impart such adjustment to said sections, including pull elements having hooks engaging the ends of one of said sections and push elements having feet engaging the ends of the other section.

4. A bearing comprising, in combination, a housing having a bore therein, a box comprising sections mounted in said bore and rotatively adjustable to take up wear on said box, and means to so adjust said sections including pull elements acting on the ends of one of said sections and push elements acting on the ends of the other section, said elements projecting in the same general direction from said box.

5. A bearing comprising, in combination, a housing having a bore therein, an eccentric box comprising sections mounted in said bore and rotatively adjustable to take up wear on said box, and means to so adjust said sections including pull and push elements acting on the ends of said sections, the latter having recesses receiving portions of said elements to prevent interference from said portions with the adjustment of adjacent ends of said sections toward one another.

6. A bearing box comprising, in combination, curved, wedge-shaped sections having an eccentric bore adapted to receive a rotative member, and means to relatively adjust said sections to take up wear thereon, including adjustable pull elements engaging the opposite ends of one of said sections, and adjustable push elements engaging the opposite ends of the other section.

7. A bearing box comprising, in combination, curved, wedge-shaped sections, adapted to receive a rotative member, and means relatively to adjust said sections, including adjustable pull elements engaging the opposite ends of one of said sections.

8. A bearing box comprising, in combination, curved, wedge-shaped sections adapted to receive a rotative member, and means relatively to adjust said sections, including adjustable push elements engaging the opposite ends of one of said sections.

9. A device of the character described, comprising, in combination, a housing having a bore therein, a box comprising curved sections of varying thickness mounted in said bore and rotatively adjustable to take up wear on said box, means to so adjust said sections including elements acting on both ends of each of said sections, flanges on said sections coöperating with one side of said housing to limit axial movement of said box in one direction, a shoulder on said shaft engaging said flanges, and nut and washer means on said shaft coöperating with said shoulder and the opposite face of said housing to limit axial movement of said box in the opposite direction.

10. A device of the character described, comprising, in combination, a housing having a bore therein, a box comprising wedge-shaped, curved sections mounted in said bore and rotatively adjustable to take up wear on said box, means to so adjust said sections including elements acting on both ends of each of said sections, the latter being slidably axially into and out of said bore, and means to confine said sections against axial movement in said bore.

In testimony whereof, I have signed my name to this specification.

WILLIAM C. FARNUM.